United States Patent
Verhoog

(10) Patent No.: US 10,197,143 B2
(45) Date of Patent: *Feb. 5, 2019

(54) HYDROKINETIC TORQUE COUPLING DEVICE FOR MOTOR VEHICLE

(71) Applicant: VALEO EMBRAYAGES, Amiens (FR)

(72) Inventor: Roel Verhoog, Gournay sur Aronde (FR)

(73) Assignee: VALEO EMRAYAGES, Amiens (FR)

(*) Notice: Subject to any disclaimer, the term of this patent is extended or adjusted under 35 U.S.C. 154(b) by 301 days.

This patent is subject to a terminal disclaimer.

(21) Appl. No.: 15/133,587

(22) Filed: Apr. 20, 2016

(65) Prior Publication Data

US 2017/0307056 A1  Oct. 26, 2017

(51) Int. Cl.
 *F16H 45/02* (2006.01)

(52) U.S. Cl.
 CPC ..... *F16H 45/02* (2013.01); *F16H 2045/0205* (2013.01); *F16H 2045/0215* (2013.01); *F16H 2045/0226* (2013.01); *F16H 2045/0278* (2013.01)

(58) Field of Classification Search
 CPC ............. F16H 45/02; F16H 2045/0205; F16H 2045/0215; F16H 2045/0221; F16H 2045/0226; F16H 2045/0231; F16H 2045/0278; F16H 2045/0294
 See application file for complete search history.

(56) References Cited

U.S. PATENT DOCUMENTS

| | | | |
|---|---|---|---|
| 2,130,895 | A | 9/1938 | Ness |
| 2,860,747 | A | 11/1958 | Kelley |
| 2,992,713 | A | 7/1961 | Stump et al. |
| 3,041,892 | A | 7/1962 | Schjolin |
| 3,252,352 | A | 5/1966 | General et al. |

(Continued)

FOREIGN PATENT DOCUMENTS

| | | |
|---|---|---|
| DE | 1550957 A1 | 7/1969 |
| DE | 2245901 A1 | 4/1974 |

(Continued)

OTHER PUBLICATIONS

Lindemann et al., "iTC—Innovative Solutions for Torque Converters Pave the Way into the Future", Torque Converter, Schaeffler Symposium book 2014, pp. 280-301, Schaeffler Technologies AG & Co. KG.

*Primary Examiner* — Richard M Lorence
(74) *Attorney, Agent, or Firm* — Berenato & White, LLC

(57) ABSTRACT

A hydrokinetic torque coupling device includes a turbine wheel (3), an impeller wheel (2) able to hydrokinetically drive the turbine wheel (3), a cover (5) non-rotatably attached to the impeller wheel (2) so as to define an internal volume (6) accommodating the turbine wheel (3), and a seal (18) mounted to a radially external periphery of the turbine wheel (3). The turbine wheel (3) being able to be axially moved between an engaged position and a disengaged position. The seal (18) configured to engage one of a matching sealing surface (22) of the impeller wheel (2) positioned radially outside the turbine wheel (3) and the cover (5) in the engaged position and to be disengaged from one of the matching sealing surface (22) the impeller wheel (2) and the cover (5) in the disengaged position.

22 Claims, 3 Drawing Sheets

(56) References Cited

U.S. PATENT DOCUMENTS

| | | | |
|---|---|---|---|
| 4,041,701 A | 8/1977 | Goto et al. | |
| 5,348,127 A * | 9/1994 | Murata | F16F 15/134 192/3.3 |
| 5,713,442 A | 2/1998 | Murata et al. | |
| 5,813,505 A | 9/1998 | Olsen et al. | |
| 6,026,940 A | 2/2000 | Sudau | |
| 6,915,886 B2 | 7/2005 | Dacho et al. | |
| 7,191,879 B2 | 3/2007 | Arhab et al. | |
| 7,445,099 B2 | 11/2008 | Maucher et al. | |
| 8,276,723 B2 | 10/2012 | Verhoog et al. | |
| 9,845,854 B2 * | 12/2017 | Depraete | F16H 45/02 |
| 9,909,658 B2 * | 3/2018 | Depraete | F16H 41/24 |
| 2003/0168298 A1 | 9/2003 | Holler et al. | |
| 2003/0168299 A1 | 9/2003 | Holler et al. | |
| 2004/0011032 A1 | 1/2004 | Holler et al. | |
| 2006/0086584 A1 | 4/2006 | Maucher et al. | |
| 2013/0230385 A1 | 9/2013 | Lindemann et al. | |
| 2014/0014454 A1 | 1/2014 | Davis | |
| 2014/0014455 A1 | 1/2014 | Davis | |
| 2014/0097055 A1 | 4/2014 | Lindemann et al. | |
| 2014/0110207 A1 | 4/2014 | Davis | |
| 2015/0021135 A1 | 1/2015 | Jameson | |
| 2015/0027110 A1 | 1/2015 | Lindemann et al. | |
| 2015/0037158 A1 | 2/2015 | Steinberger et al. | |
| 2015/0068857 A1 | 3/2015 | Lindemann et al. | |
| 2018/0031099 A1 * | 2/2018 | Verhoog | F16H 45/02 |
| 2018/0051785 A1 * | 2/2018 | Gradolph | F16H 45/02 |

FOREIGN PATENT DOCUMENTS

| | | |
|---|---|---|
| DE | 10226860 A1 | 12/2003 |
| EP | 0125428 A1 | 11/1984 |
| EP | 1744074 A2 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | S58-131466 A | 8/1983 |
| KR | 1013115310000 B1 | 9/2013 |
| WO | WO2004018897 A1 | 3/2004 |
| WO | WO2004046574 A1 | 6/2004 |

* cited by examiner

HYDROKINETIC TORQUE COUPLING DEVICE FOR MOTOR VEHICLE

FIELD OF THE INVENTION

The present invention relates to a hydrokinetic torque coupling device for a motor vehicle, such as a torque converter, for instance.

BACKGROUND OF THE INVENTION

The patent application US 2015/0021135 discloses a hydrodynamic torque converter comprising an impeller wheel intended to be coupled to a crankshaft and adapted to hydrokinetically rotate a turbine wheel, through a reactor. The impeller wheel is rotationally coupled to a cover wherein the impeller wheel, the turbine wheel and/or the damping means are at least partially accommodated. The turbine wheel comprises friction linings and is adapted to be axially moved between an engaged position in which the turbine wheel and the impeller wheel are axially moved closer to each other and rotationally coupled together, with the friction linings of the turbine wheel resting on a radial supporting surface of the impeller wheel, and a disengaged position in which the turbine wheel and the impeller wheel are axially moved away from each other and rotationally uncoupled.

The hydrodynamic torque coupling device further comprises a hub intended to be coupled to a transmission input shaft, connected to the turbine wheel through damping means.

The damping means comprise an annular wheel disc integral with the hub, two guiding washers axially positioned on either side of the annular wheel disc, and first elastic members acting on the circumference mounted between the annular wheel disc and the guiding washers. The first elastic members are adapted to act against the pivoting of the guiding washers relative to the annular wheel disc. The damping means further comprise second elastic members acting onto the circumference and mounted between a linking member attached to the turbine wheel and one of the guiding washers. The second elastic members are adapted to oppose the pivoting of the guiding washers relative to the turbine wheel.

In operation, in the disengaged position of the turbine wheel, the torque is transmitted from the crankshaft of the vehicle engine to the cover and to the impeller wheel, with such torque being then transmitted to the turbine wheel through the hydrokinetic coupling means formed by the impeller wheel, the turbine wheel and the reactor. The torque is then transmitted to the hub through the damping means.

When the turbine wheel is in the engaged position, the torque is directly transmitted from the cover and from the impeller wheel to the turbine wheel, without any action from the hydrokinetic coupling means. The torque is then transmitted to the hub through the damping means.

The turbine wheel moving between the engaged and disengaged positions thereof thus makes it possible to activate or deactivate the hydrokinetic coupling.

Additionally, the torque converter is adapted to operate in a so-called direct mode, wherein the torque is transmitted from the impeller wheel to the turbine wheel. More specifically, in the disengaged position of the turbine wheel, i.e. when the hydrokinetic coupling is activated, the impeller wheel turns faster than the turbine wheel. Conversely, in a so-called back operation, the turbine wheel can turn faster than the impeller wheel.

The back operation mode is used for instance when the motor brake is used or when the user suddenly takes his/her foot off the accelerator pedal.

In some operation cases, specifically in the back mode and when the hydrokinetic coupling is activated, the turbine wheel may be axially pushed back opposite the impeller wheel. Such a motion of the turbine wheel has to be limited so as to prevent any damage to the torque converter, in particular.

In the torque converter disclosed in the patent application US 2015/0021135, the radially internal periphery of one of the guiding washers comprises a large rest area adapted to rest on a radial part of the cover, so as to limit the motion of the turbine wheel-damping means assembly.

In this embodiment, the turbine wheel indirectly axially rests on the radial part of the cover through a large number of parts. The accurate position of the turbine wheel is not easily controlled because of the dimension tolerance of each part belonging to the corresponding chain of dimensions.

Besides, the large area where on the mentioned above guiding washer on the cover generates a significant frictional torque in operation.

In such a torque converter, the friction linings provide sealing between the turbine wheel and the impeller wheel, in the engaged position.

SUMMARY OF THE INVENTION

Because of the constant increase in the torques to be transmitted, a need exists to maximize the axial stress generated on the turbine wheel by the difference in pressure exerted by the fluid on either side of said turbine wheel.

The invention more particularly aims at providing a simple, efficient and cost-effective solution to these problems.

For this purpose, it provides for a hydrokinetic torque coupling device for a motor vehicle, comprising an impeller wheel intended to be coupled to a crankshaft and able to hydrokinetically drive a turbine wheel into rotation, with the turbine wheel being able to be axially moved between an engaged position in which the turbine wheel and the impeller wheel are rotationally coupled together, and a disengaged position, in which the turbine wheel and the impeller wheel are rotationally uncoupled, characterized in that the radially external periphery of the turbine wheel comprises a seal able to come to rest onto a matching sealing surface positioned radially outside the turbine wheel, onto the impeller wheel or onto a part rotationally coupled to the impeller wheel in the engaged position.

As the seal is positioned on the radially external periphery of the turbine wheel, the surfaces exposed to the fluid pressure are maximized, which makes it possible to significantly increase the axial stress exerted onto the turbine wheel, and thus the clutching stress and the torque which can be transmitted in the engaged position too.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

In the engaged position, the turbine wheel and the impeller wheel may be axially moved away from one another, In the disengaged position, the turbine wheel and the impeller wheel may be axially moved closer to each other.

The seal may be able to be moved away from said sealing surface in the disengaged position.

Thus, in the disengaged position, i.e. when the hydrokinetic coupling means consisting of the turbine wheel and the impeller wheel are active, the wear of the seal due to friction upon rotation of the turbine wheel and of the seal relative to the impeller wheel is thus prevented.

The turbine wheel may comprise friction means able to cooperate with matching friction means on the impeller wheel or a part connected to said impeller wheel, with the friction means of the turbine wheel being positioned in a zone away from the seal.

The sealing and friction coupling functions are thus dissociated and separated in distinct zones of the hydrokinetic coupling device.

The impeller wheel or said part connected to said impeller wheel may comprise a cylindrical surface and an annular groove arranged in said cylindrical surface, with the seal of the turbine wheel being annular and being able to come to rest onto said cylindrical surface in the engaged position, with the seal being positioned axially opposite the groove in the disengaged position.

In the disengaged position, the seal is thus positioned opposite the groove, so as not to rub against the cylindrical surface mentioned above any possible damage to the seal is thus prevented.

The seal is a lip seal, for instance.

The turbine wheel and/or the seal may comprise leakage means able to enable a fluid flow through said turbine wheel and/or said seal.

The leakage means consist of cylindrical holes, for instance, arranged in he turbine wheel and/or in the seal, or of notches provided on the radially external periphery of the seal.

The leakage means comprise, for instance, at least one cylindrical hole having diameter ranging from 0.5 to 1.5 mm, preferably of about 0.8 mm.

The leakage means enable a fluid flow ranging from 0.2 l/min to 5 l/min, for instance.

A hydrokinetic torque coupling device may comprise a bracing member axially extending between the turbine wheel and a cover rotationally coupled to the impeller wheel, with the bracing member being able to limit the axial motion of the turbine wheel towards the cover, opposite the turbine wheel.

The motion of the turbine wheel can thus be limited by resting on the cover through a limited number of parts. The position of the turbine wheel can thus be accurately controlled.

The bracing member makes it possible to take over the stresses so as to limit the constraints exerted specifically onto the turbine wheel, and thus to increase the service life of the hydrokinetic coupling device.

The cover may be able to accommodate, at least partially, the impeller wheel, the turbine wheel and the reactor.

Additionally, the dimensions of the rest area of the bracing member on the cover or on the turbine wheel can be so adjusted that friction is reduced. The materials used can of course also be chosen so as to reach this goal.

The bracing member may be attached to the turbine wheel or to the cover, respectively, to a so-called attachment end, with the turbine wheel or the cover, respectively, being adapted to rest on another so-called rest end of the bracing member.

The bracing member may be provided with at least one friction lining adapted to come to rest onto a matching friction surface of the cover, or the turbine wheel respectively, in the engaged position, so as to provide the rotational coupling of the turbine wheel and the cover.

The hydrokinetic torque coupling device may comprise damping means mounted between the turbine wheel and a hub intended to be coupled to a transmission input shaft.

The damping means make it possible to titer the vibrations and the rotation acyclism.

The damping means may comprise an annular wheel disc connected to the hub and a least one guiding washer connected to the turbine wheel, with at least one first elastic member acting on the circumference being mounted between the annular wheel disc and the guiding washer, with the first elastic member being adapted to oppose the relative rotation of the annular wheel disc relative to the guiding washer.

The damping means may comprise at least one second elastic member mounted between the guiding washer and the turbine wheel, with the second elastic member being adapted to oppose the relative rotation of the turbine wheel relative to the guiding washer.

The damping means are thus of the LTD (<<Long Travel Damper>>) type and, enable a significant displacement on the circumference, so as to improve the filtering quality of the damping means.

The hydrokinetic torque coupling device may also comprise one or ore of the following characteristics:
  the impeller wheel is adapted to hydrokinetically rotate a turbine wheel, through a reactor,
  the annular wheel disc and the hub are integral with each other and fore a single part.
  the bracing member is attached to the turbine wheel or o the cover by rivets, by welding, or by glueing,
  the bracing member is formed in steel sheet, for example by drawing.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
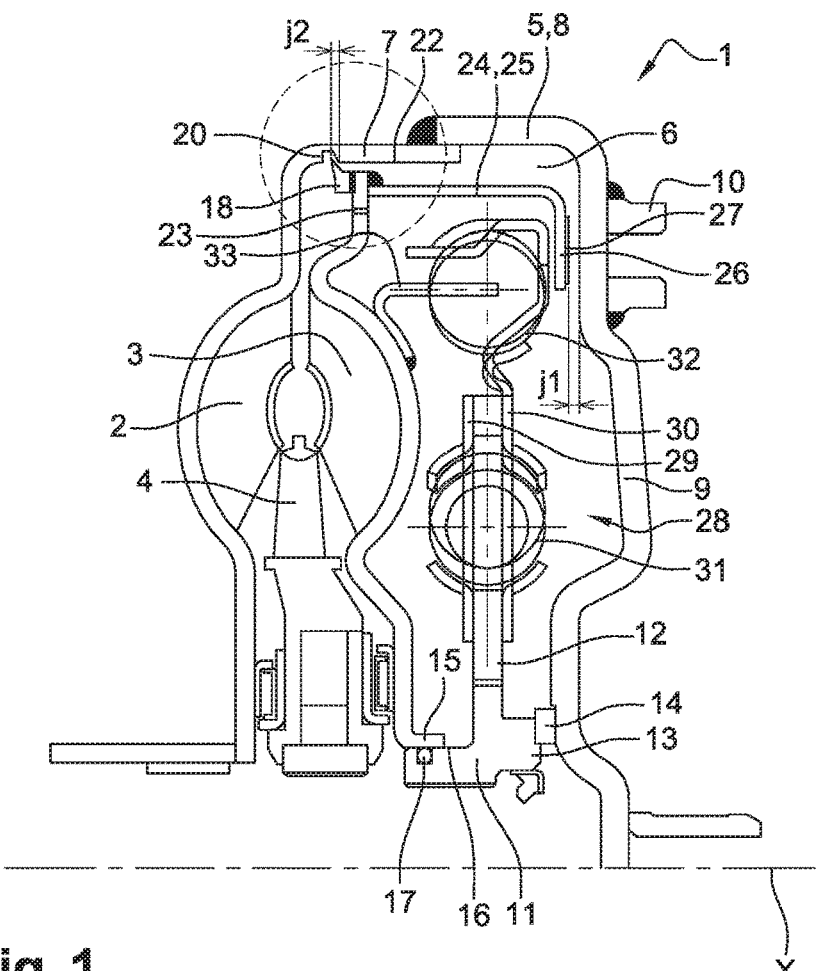
FIG. 1 is a half-sectional view along an axial plane, of a torque converter according to a first embodiment of the invention, in the disengaged position.

A hydrokinetic torque coupling device according to a first embodiment of the invention is shown in FIGS. 1 to 4. The hydrokinetic torque coupling device is more particularly a hydrokinetic torque converter.

Such device makes it possible to transmit a torque from the output shaft of an internal combustion engine in a motor vehicle, such as for instance a crankshaft, to a transmission input shaft. The axis of the torque converter bears reference X.

In the following, the words "axial" and "radial" are defined relative to the X axis.

The torque converter 1 comprises an impeller bladed wheel 2, able to hydrokinetically drive a turbine bladed wheel 3 through a reactor 4.

The impeller wheel 2 is non-moveably attached to a cover 5 by welding and defines with said cover 5 an internal volume 6 accommodating the impeller wheel 2, the turbine wheel 3 and the reactor 4. The impeller wheel comprises a cylindrical part 7 on the radially external periphery thereof, attached to a cylindrical part 8 of the cover 5, with the front end of said cylindrical part 8 being extended by a radial part 9 radially extending inwards. The radial part 9 comprises attaching means 10 making it possible to rotationally couple said cover 5 to the crankshaft.

The torque converter 1 further comprises a central hub 11, the radially internal periphery of which is ribbed, having an X axis and being accommodated in the internal volume 6. The central hub 11 comprises an annular rim 12 which radially extends outwards and a front end 13, facing the turbine wheel 3. A pad 14 adapted to limit friction and made of a synthetic material for instance, is inserted between the front end 13 of the hub 11 and the radial part 9 of the cover 5.

The turbine wheel 3 comprises a cylindrical rim 15 on the radially internal periphery thereof, mounted about a cylindrical part 16 formed at the back end of the hub 11. Said cylindrical part 16 comprises an O-ring 17 mounted in a groove of the hub 11. The turbine wheel 3 is adapted to axially move relative to said cylindrical part 16 of the hub 11.

An annular seal 18, such as an elastomeric lip seal, for instance is mounted on the radially external periphery of the turbine wheel 3. As can be best seen in FIG. 2, a lip 19 of the lip seal 18 is able to come to rest onto (i.e., engage) a radially internal cylindrical surface (or a matching sealing surface) 22 of the cylindrical part 7 of the impeller wheel 2, or opposite the annular groove 20 arranged in the cylindrical surface 22, depending on the axial position of the turbine wheel 3.

The seal 18 is for example glued to the radially external periphery of the turbine wheel 3.

Figure 5:
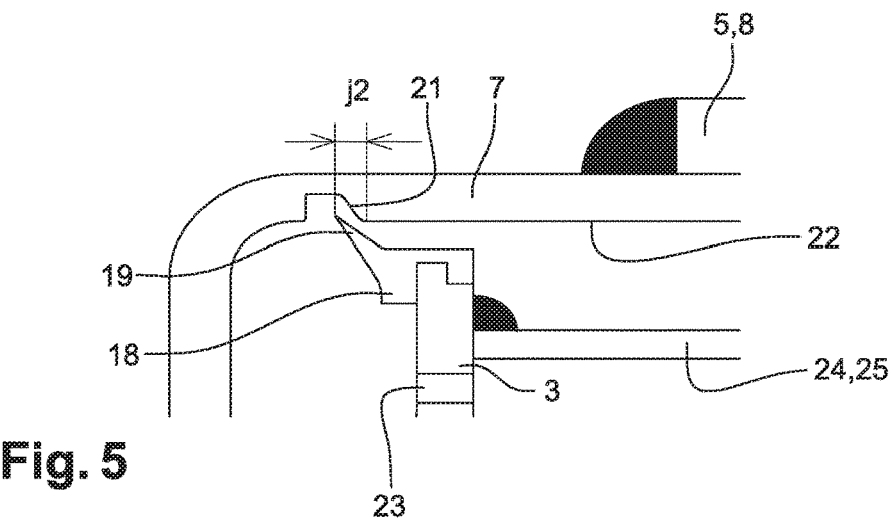
FIG. 5 is a view corresponding to FIG. 2, illustrating an alternative embodiment of the invention.

According to an alternative embodiment illustrated in FIG. 5, the seal 18 may be overmolded onto the turbine wheel 3.

The lip 19 may be tilted rearwards and radially outwards. The front end of the groove 20 may also comprise a surface 21 inclined in the same direction as the lip 19, so as to gradually follow the deformation of the lip 19 when the seal 18 axially moves from the groove 20 towards the cylindrical surface 22.

The seal 18 and/or the turbine wheel 3 may comprise openings 23 such as cylindrical holes or notches, for instance. The diameter of the holes 23 ranges from 0.5 to 1.5 mm, for instance, is about 0.8 mm, for example. A bracing member 24 is attached, for example by welding, on the radially external periphery of the turbine wheel 3, opposite the impeller wheel 2. The bracing member 24 comprises an axially extending annular part 25, the front end of which is extended by lugs 26 or a rim extending radially inwards. The rim 26 supports a friction lining 27 adapted to come to rest onto the radial part 9 of the cover 5.

Figure 2:
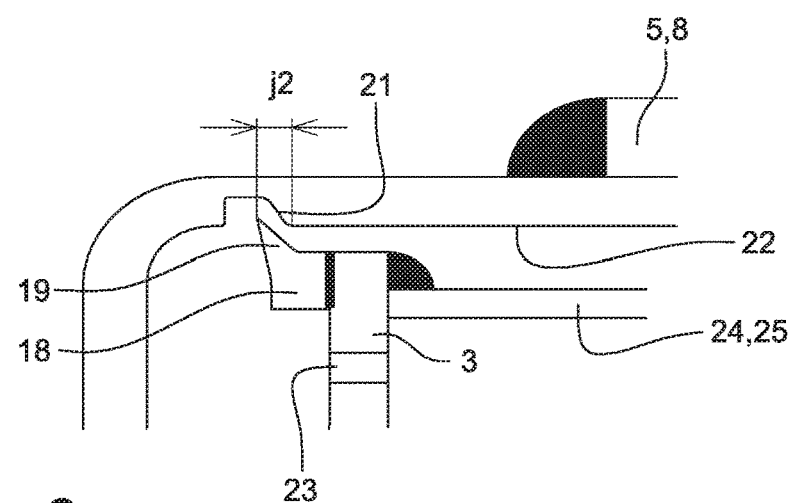
FIG. 2 is a detailed view of FIG. 1.
Figure 3:
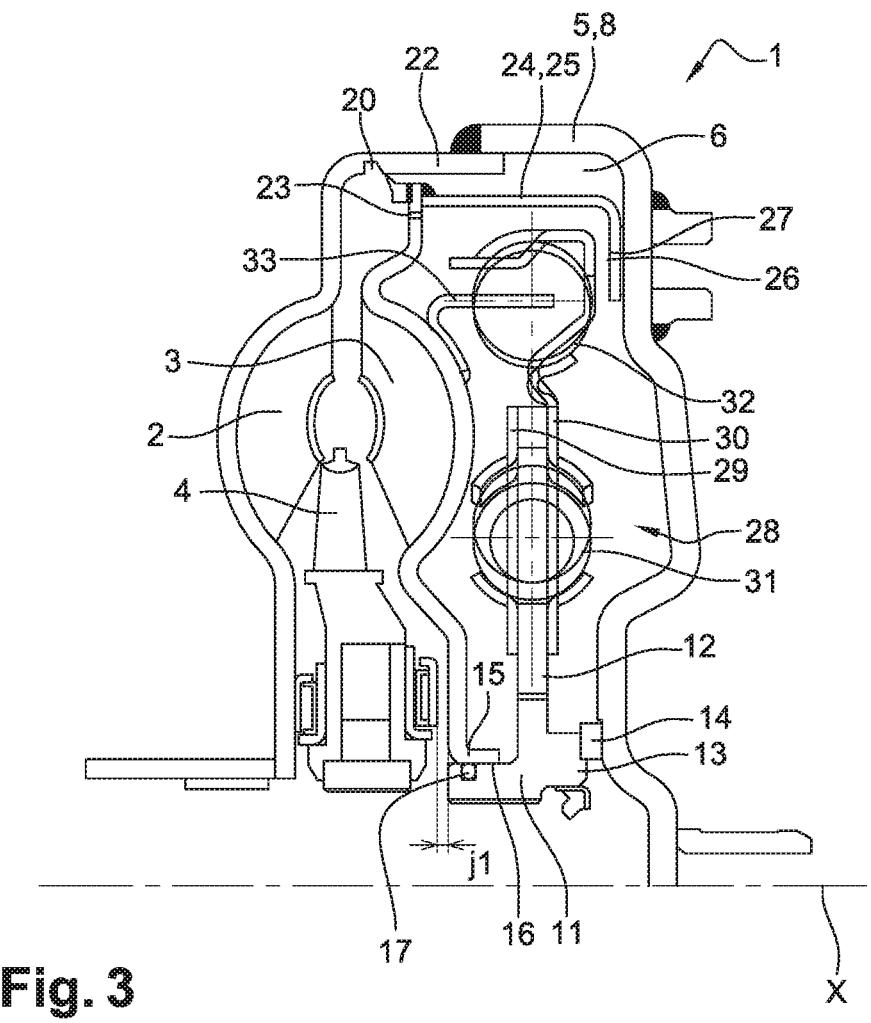
FIG. 3 is a view corresponding to FIG. 1, in the engaged position of he torque converter.
Figure 4:
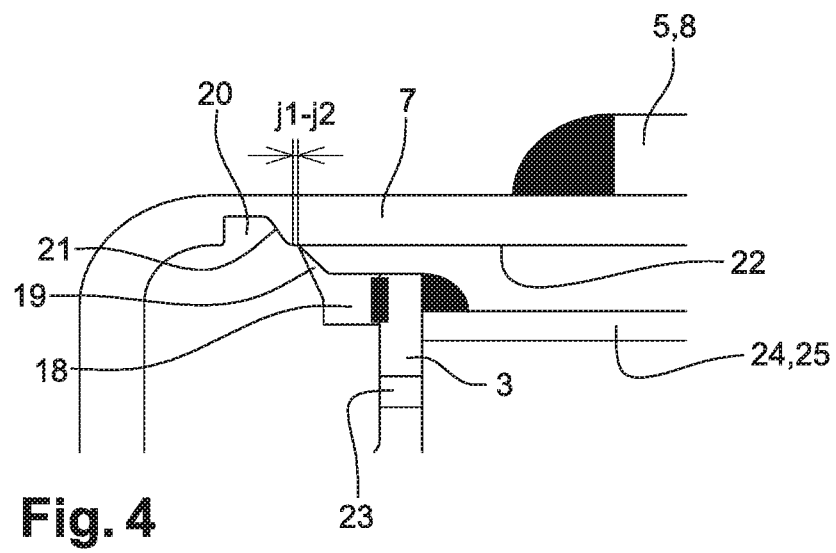
FIG. 4 is a detailed view of FIG. 3.

The turbine wheel 3 is able to be axially moved from a disengaged position illustrated in FIGS. 1 and 2, in which the turbine wheel 3 and the impeller wheel 2 are axially moved closer to one another and rotationally uncoupled, and an engaged position, illustrated in FIGS. 3 and 4, in which the turbine wheel 3 and the impeller wheel 2 are axially separated and in which the rim 26 and the friction lining 27 are supported by (or frictionally non-rotatably engage the cover 5 so as to rotationally couple the turbine wheel 3, the cover 5 and the impeller wheel 2.

The motion of the turbine wheel 3 is controlled by pressure chambers positioned on either side of the turbine wheel 3 and separated from one another by the seal 18. The openings 23 make it possible to generate a leakage rate ranging from 0.2 l/min to 5 l/min through the turbine wheel 3 or the seal 18, for instance.

In the disengaged position, the axial position of the turbine wheel 3 is such that the lip 19 of the seal 18 faces the groove 20 (FIGS. 1 and 2). Thus the seal 18 does not rest on (i.e., does not engage) the impeller wheel 2. On the contrary, in the engaged position, the axial position of the turbine wheel 3 is such that the lip 19 of the seal 18 rests on (i.e.,engages) the cylindrical part 7 of the impeller wheel 2, so as to seal the pressure chambers, except for the leakage rate generated by the above-mentioned openings 23 of the seal 18 and/or the turbine wheel 3 (FIGS. 3 and 4).

It should be noted that the axial clearance j1 between the friction lining 27 and, the radial part 9 of the cover is greater than the clearance j2 between the lip 19 of the seal 18 and the front end of the groove (FIG. 1). The clearance j1 is for example approximately 2 mm and the clearance j2 is for example approximately 1.8 mm. This secures the resting of the lip 19 on the cylindrical surface in the engaged position (FIGS. 3 and 4), It should also be noted that, in case of wear of the friction lining, the clearance j1 is increased, according to the above-mentioned principle.

The turbine wheel 3 is rotationally coupled to the hub 11 through a damping device 28.

The damping device 28 comprises the annular wheel disc 12 integral with the hub 11, two guiding washers 29, 30 axially positioned on either side of the annular wheel disc 12, and first elastic members 31 acting on the circumference mounted between the annular wheel disc 12 and the guiding washers 29, 30. The first elastic members 31 are adapted to act against the pivoting of the guiding washers 29, 30 relative to the annular wheel disc 12. The damping device 28 further comprises second elastic members 32 acting on the circumference, mounted between a linking member 33 attached to the turbine wheel 3, for instance by welding, and the radially external periphery of one of the guiding washers 29, 30, for instance the radially external periphery of the guiding washer 30 opposite the turbine wheel 3. The second elastic members 32 are adapted to act against the pivoting of the guiding washers 29, 30 relative to the turbine wheel 3.

The first and second elastic members 31, 32 are for instance straight or curved coil compression springs.

In operation, in the disengaged position of the turbine wheel 3, the torque is transmitted from the crankshaft of the vehicle engine to the cover 5 and to the impeller wheel 2, with such torque being then transmitted to the turbine wheel 3 through the hydrokinetic coupling means formed by the impeller wheel 2, the turbine wheel 3 and the reactor 4. The torque is then transmitted to the hub 11 through the damping means 28. As mentioned above, in this disengaged position, the seal 18 does not rest on the impeller wheel 2 and is positioned axially opposite the groove 20 so that the seal 18 does not rub on the impeller wheel 2 during the relative rotation of the impeller wheel 2 relative to the turbine wheel 3.

When the turbine wheel 3 is in the engaged position, the torque is directly transmitted from the cover 5 and from the impeller wheel 2 to the turbine wheel 3, without any action from the hydrokinetic coupling means. The torque is then transmitted to the hub 11 through the damping means 28. In this position, the seal 18 rests on the cylindrical part 7 of the impeller wheel 2, with the latter being rotationally coupled to the turbine wheel 3. Since no relative rotation exists between the impeller wheel 2 and the turbine wheel 3, the seal 18 thus does not rub against the impeller wheel 2 either, but simply rests on the matching surface 22 of the impeller wheel 2.

The turbine wheel 3 moving between the engaged and disengaged positions thereof thus makes it possible to activate or deactivate the hydrokinetic coupling, Additionally, the torque converter 1 is adapted to operate in a so-called direct mode, wherein the torque is transmitted from the impeller wheel 2 to the turbine wheel 3. More specifically, in the disengaged position of the turbine wheel 3, i.e. when the hydrokinetic coupling is activated, the impeller wheel 2 turns faster than the turbine wheel 3. Conversely, in a so-called back operation, the turbine wheel 3 can turn faster than the impeller wheel 2.

The back operation mode is used for instance when the motor brake is used or when the user suddenly takes his/her foot off the accelerator pedal.

In some operation cases, specifically in the back mode and when the hydrokinetic coupling is activated, the turbine wheel 3 may be axially pushed back opposite the impeller wheel 2. Such a motion of the turbine wheel 3 has to be limited so as to prevent any damage to the torque converter 1, in particular.

For this purpose, the bracing member 24 is adapted to limit the axial motion of the turbine wheel 3 towards the radial part 9 of the cover 5 opposite the impeller wheel 2.

Figure 6:
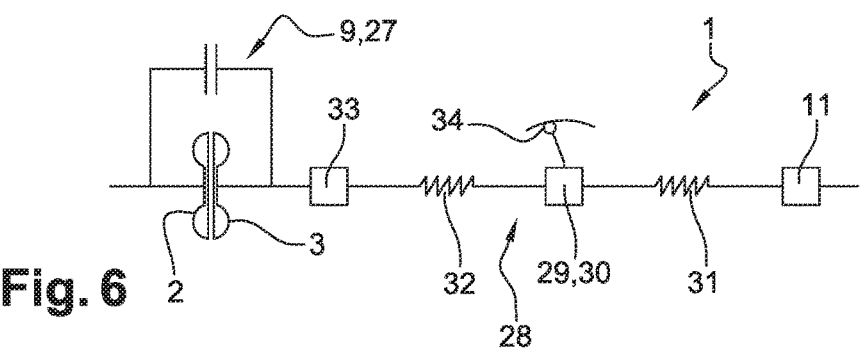
FIG. 6 is a schematic view illustrating a second embodiment of the invention.

According to one embodiment illustrated in FIG. 6, at least one of the guiding washers 29, 30 for example may be provided with pendulum masses 34, movably mounted on the corresponding guiding washer 29, 30. The pendulum masses 34 are preferably positioned on a radially external zone of the corresponding guiding washer 29, 30.

Using such pendulum masses 34 is more particularly known from documents US14/305128, GB598811, US6026940 and EP1744074.

Figure 7:
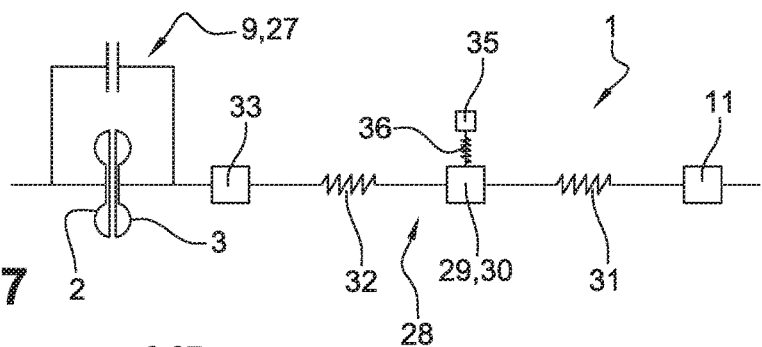
FIG. 7 is a view corresponding to FIG. 6, illustrating a third embodiment of the invention.

According to another embodiment illustrated in FIG. 7, at least one of the guiding washers 29, 30 may, for instance, be equipped with an inertial absorber, consisting of a mass 35 connected to one of the guiding washers 29, 30 by one elastic member 36 able to generate an elastic return torque on either side of a rest position. Using an inertial absorber is known more particularly from document WO2004/018897. The stiffness constant of such elastic member 36 may change or not, and the elastic member may consist of at least one coil spring, for instance.

Figure 8:
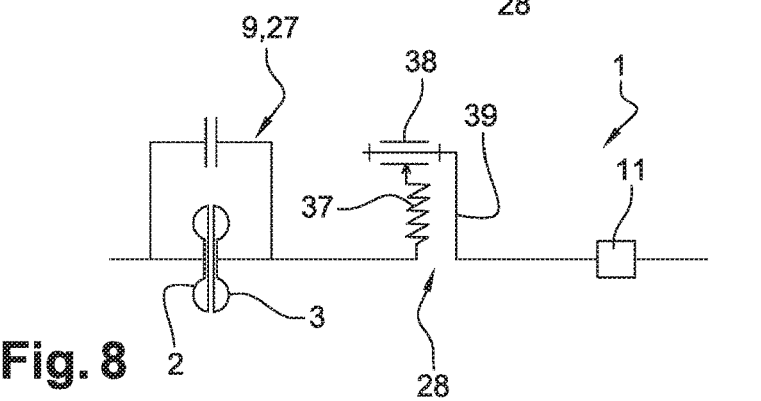
FIG. 8 is a view corresponding to FIG. 6, illustrating a fourth embodiment of the invention.

According to still another embodiment illustrated in FIG. 8, the damping means 28 may consist of at least one elastically deformable leaf 37 coupled to the turbine wheel 3 or to the hub 11 respectively, at least one bearing member 38 pivotally mounted on a support 39 coupled to the hub 11 or to the turbine wheel 3 respectively, with each leaf 37 being elastically held and radially resting on the corresponding bearing member 38 so as to bend upon rotation of the hub 11 relative to the turbine wheel 3.

Using such an elastic leaf is more particularly known from document FR3000155.

The invention claimed is:

1. A hydrokinetic torque coupling device (1) for a motor vehicle, comprising:
    an impeller wheel (2) intended to be coupled to a crankshaft; and
    a turbine wheel (3) hydrokinetically driven by the impeller wheel (2), the turbine wheel (3) axially moveable between an engaged position in which the turbine wheel (3) and the impeller wheel (2) are non-rotatably coupled together, and a disengaged position, in which the turbine wheel (3) and the impeller wheel (2) are rotationally uncoupled;
    a cover (5) non-rotatably attached to the impeller wheel (2) so as to define an internal volume (6) accommodating the turbine wheel (3); and
    a seal (18) mounted to a radially external periphery of the turbine wheel (3), the seal (18) configured to engage a matching sealing surface (22) of one of the impeller wheel (2) and the cover (5) in the engaged position and to be disengaged from one of the matching sealing surface (22) the impeller wheel (2) and the cover (5) in the disengaged position,
    the matching sealing surface (22) positioned radially outside the turbine wheel (3).

2. The hydrokinetic torque coupling device (1) according to claim 1, wherein the seal (18) is moveable away from the sealing surface (22) in the disengaged position.

3. The hydrokinetic torque coupling device (1) according to claim 2, wherein the turbine wheel (3) comprises a friction device (26, 27) configured to cooperate with a matching friction surface of the impeller wheel (2) or the cover (5), and wherein the friction device (26, 27) of the turbine wheel (3) is positioned in a zone away from the seal (18).

4. The hydrokinetic torque coupling device (1) according to claim 2, wherein the impeller wheel (2) or the cover (5) comprises a cylindrical surface (22) defining the matching sealing surface (22) and an annular groove (20) arranged in the cylindrical surface (22), wherein the seal (18) of the turbine wheel (3) is annular and configured to engage the cylindrical surface (22) in the engaged position, and wherein the seal (18) is positioned axially opposite the groove (20) in the disengaged position.

5. The hydrokinetic torque coupling device (1) according to claim 2, wherein the seal (18) is a lip seal (19).

6. The hydrokinetic torque coupling device (1) according to claim 2, wherein one of the turbine wheel (3) and the seal (18) comprise a leakage opening (23) enabling fluid flow through one of the turbine wheel (3) and the seal (18).

7. The hydrokinetic torque coupling device (1) according to claim 1, wherein the turbine wheel (3) comprises a friction device (26, 27) configured to cooperate with a matching friction surface of the impeller wheel (2) or the cover (5), and wherein the friction device (26, 27) of the turbine wheel (3) is positioned in a zone away from the seal (18).

8. The hydrokinetic torque coupling device (1) according to claim 7, wherein the impeller wheel (2) or the cover (5) comprises a cylindrical surface (22) defining the matching sealing surface (22) and an annular groove (20) arranged in the cylindrical surface (22), wherein the seal (18) of the turbine wheel (3) is annular and configured to engage the cylindrical surface (22) in the engaged position, and wherein the seal (18) is positioned axially opposite the groove (20) in the disengaged position.

9. The hydrokinetic torque coupling device (1) according to claim 7, wherein the seal (18) is a lip seal (19).

10. The hydrokinetic torque coupling device (1) according to claim 7, wherein one of the turbine wheel (3) and the seal (18) comprise a leakage opening (23) enabling fluid flow through one of the turbine wheel (3) and the seal (18).

11. The hydrokinetic torque coupling device (1) according to claim 1, wherein one of the impeller wheel (2) and the cover (5) comprises a cylindrical surface (22) defining the matching sealing surface (22) and an annular groove (20) arranged in the cylindrical surface (22), wherein the seal (18) of the turbine wheel (3) is annular and configured to engage the cylindrical surface (22) in the engaged position, and wherein the seal (18) is positioned axially opposite the groove (20) in the disengaged position.

12. The hydrokinetic torque coupling device (1) according to claim 11, wherein the seal (18) is a lip seal (19).

13. The hydrokinetic torque coupling device (1) according to claim 11, wherein one of the turbine wheel (3) and the seal (18) comprise a leakage opening (23) enabling fluid flow through one of the turbine wheel (3) and the seal (18).

14. The hydrokinetic torque coupling device (1) according to claim 1, wherein the seal (18) is a lip seal (19).

15. The hydrokinetic torque coupling device (1) according to claim 14, wherein one of the turbine wheel (3) and the seal (18) comprise a leakage opening (23) enabling fluid flow through one of the turbine wheel (3) and the seal (18).

16. The hydrokinetic torque coupling device (1) according to claim 1, wherein one of the turbine wheel (3) and the seal (18) comprise a leakage opening (23) enabling fluid flow through one of the turbine wheel (3) and the seal (18).

17. The hydrokinetic torque coupling device (1) according to claim 1, further comprising a bracing member (24) axially extending between the turbine wheel (3) and the cover (5), wherein the bracing member (24) is configured to limit axial motion of the turbine wheel (3) towards the cover (5), disposed axially opposite the turbine wheel (3).

18. The hydrokinetic torque coupling device (1) according to claim 17, wherein one end of the bracing member (24) is attached to one of the turbine wheel (3) and the cover (5) and wherein another end of the bracing member (24) is configured to engage the other one of the turbine wheel (3) or the cover (5) in the engaged position.

19. The hydrokinetic torque coupling device (1) according to claim 17, wherein the bracing member (24) is provided with at least one friction lining (27) configured to engage a matching friction surface (9) of the cover (5) or the turbine wheel (3) in the engaged position, so as to non-rotatably couple together the turbine wheel (3) and the cover (5).

20. The hydrokinetic torque coupling device (1) according to claim 1, further comprising a damping device (28) mounted between the turbine wheel (3) and a hub (11) intended to be coupled with a transmission input shaft.

21. The hydrokinetic torque coupling device (1) according to claim 20, wherein the damping device (28) comprises an annular wheel disc (12) connected to the hub (11), a least one guiding washer (29, 30) connected to the turbine wheel (3), and at least a first elastic member (31) mounted circumferentially between the annular wheel disc (12) and the guiding washer (29, 30), and wherein the at least one first elastic member (31) is configured to oppose the rotation of the annular wheel disc (12) relative to the at least one guiding washer (29, 30).

22. The hydrokinetic torque coupling device (1) according to claim 21, wherein the damping device (28) further comprises at least one second elastic member (32) mounted between the at least one guiding washer (29, 30) and the turbine wheel (3), and wherein the at least one second elastic member (32) is configured to oppose the rotation of the turbine wheel (3) relative to the at least one guiding washer (29, 30).

* * * * *